(12) United States Patent
Andreopoulos et al.

(10) Patent No.: US 11,049,000 B2
(45) Date of Patent: Jun. 29, 2021

(54) DISTRIBUTED STATE VIA CASCADES OF TENSOR DECOMPOSITIONS AND NEURON ACTIVATION BINDING ON NEUROMORPHIC HARDWARE

(71) Applicant: INTERNATIONAL BUSINESS MACHINES CORPORATION, Armonk, NY (US)

(72) Inventors: Alexander Andreopoulos, San Jose, CA (US); Myron D. Flickner, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 634 days.

(21) Appl. No.: 15/937,357

(22) Filed: Mar. 27, 2018

(65) Prior Publication Data
US 2019/0303747 A1 Oct. 3, 2019

(51) Int. Cl.
*G06N 3/063* (2006.01)
(52) U.S. Cl.
CPC .................... *G06N 3/063* (2013.01)
(58) Field of Classification Search
CPC ..................................................... G06N 3/063
See application file for complete search history.

(56) References Cited

U.S. PATENT DOCUMENTS

| | | | |
|---|---|---|---|
| 9,330,355 B2 | 5/2016 | Rangan | |
| 2015/0106311 A1 | 4/2015 | Birdwell et al. | |
| 2015/0106314 A1 | 4/2015 | Birdwell et al. | |
| 2015/0112911 A1* | 4/2015 | Jackson | G06N 3/063 706/29 |
| 2015/0339570 A1 | 11/2015 | Scheffler | |
| 2019/0138898 A1* | 5/2019 | Song | G06N 3/0454 |

OTHER PUBLICATIONS

Thakur, CS., "Stochastic Electronics for Neuromorphic Systems." (2016) MARCS Institute for Brain, Behaviour and Development, Western Sydney University.
"Hardware Debugging with Dynamic Binding of Software Elements," (Dec. 18, 2015).
Rapp, J. and Fuster, J. "Dynamically Configured Hardware Accelerator Functions," (Jun. 4, 2008), Lockheed Martin.
Rapp et al. "System for Vectorized Hardware Accelerated Functions with Automatic Interface Generation." (Jun. 4, 2008), Lockheed Martin.

* cited by examiner

*Primary Examiner* — Douglas King
(74) *Attorney, Agent, or Firm* — Erik Huestis; Stephen Kenny; Foley Hoag LLP

(57) ABSTRACT

Distributed state via cascades of tensor decompositions and neuron activation binding on neuromorphic hardware is provided. In various embodiments, a kernel is divided into a plurality of subkernels. Each subkernel has less than a predetermined size. The plurality of subkernels are distributed, each to one of a plurality of neurosynaptic processors. By each of the plurality of neurosynaptic processors, one of the subkernels is applied to an input to generate a partial convolution. The partial convolutions from each of the plurality of neurosynaptic processors are combined to determine an activation.

20 Claims, 16 Drawing Sheets

Output Spikes 0 or 1 Spike

DISTRIBUTED STATE VIA CASCADES OF TENSOR DECOMPOSITIONS AND NEURON ACTIVATION BINDING ON NEUROMORPHIC HARDWARE

BACKGROUND

Embodiments of the present disclosure relate to neuromorphic hardware, and more specifically, to distributed state via cascades of tensor decompositions and neuron activation binding on neuromorphic hardware.

BRIEF SUMMARY

According to embodiments of the present disclosure, methods of and computer program products for tensor decomposition and neuron activation binding are provided. A kernel is divided into a plurality of subkernels. Each subkernel has less than a predetermined size. The plurality of subkernels are distributed, each to one of a plurality of neurosynaptic processors. By each of the plurality of neurosynaptic processors, one of the subkernels is applied to an input to generate a partial convolution. The partial convolutions from each of the plurality of neurosynaptic processors are combined to determine an activation.

DETAILED DESCRIPTION

Figure 1:
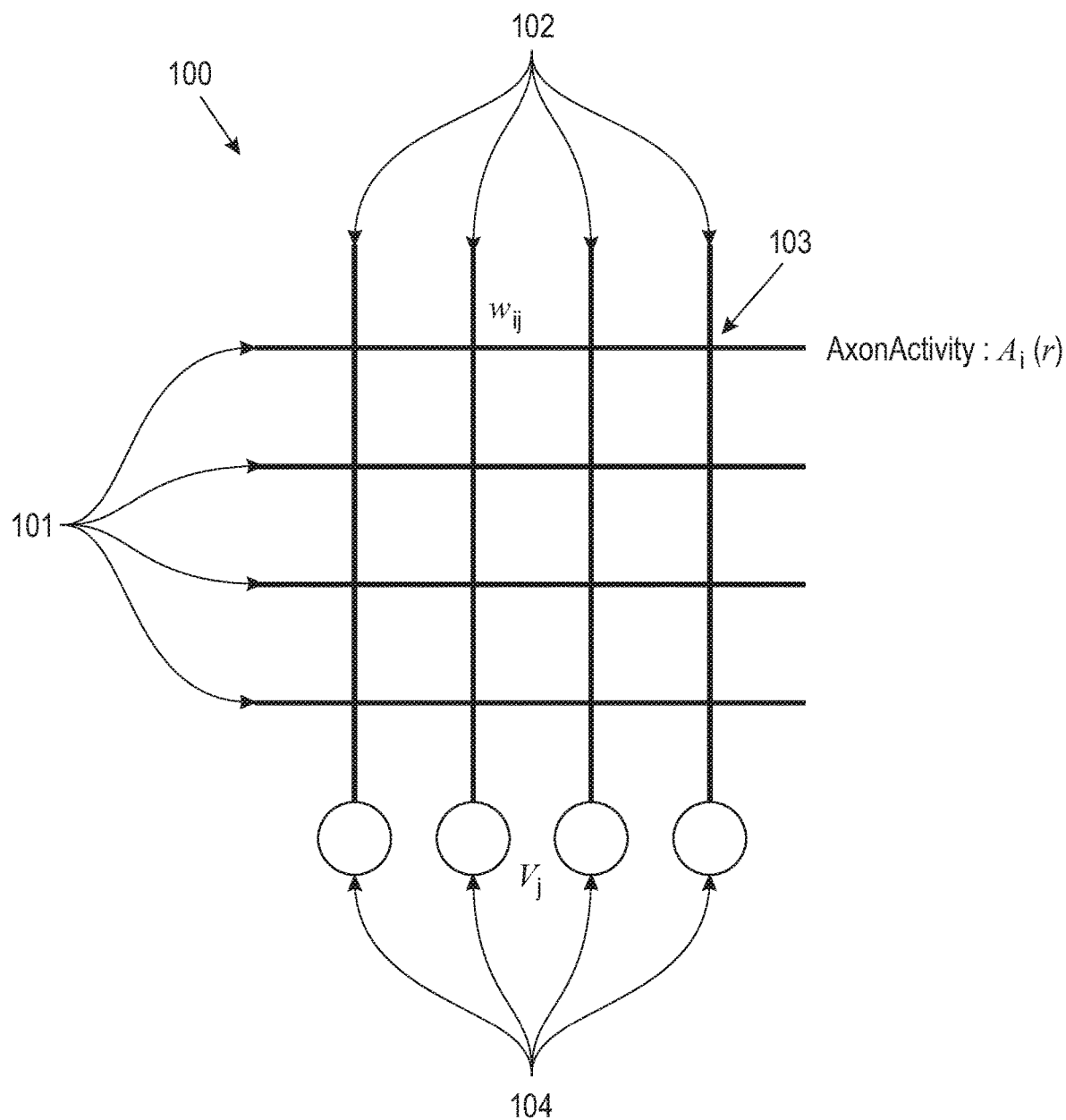
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-andconquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
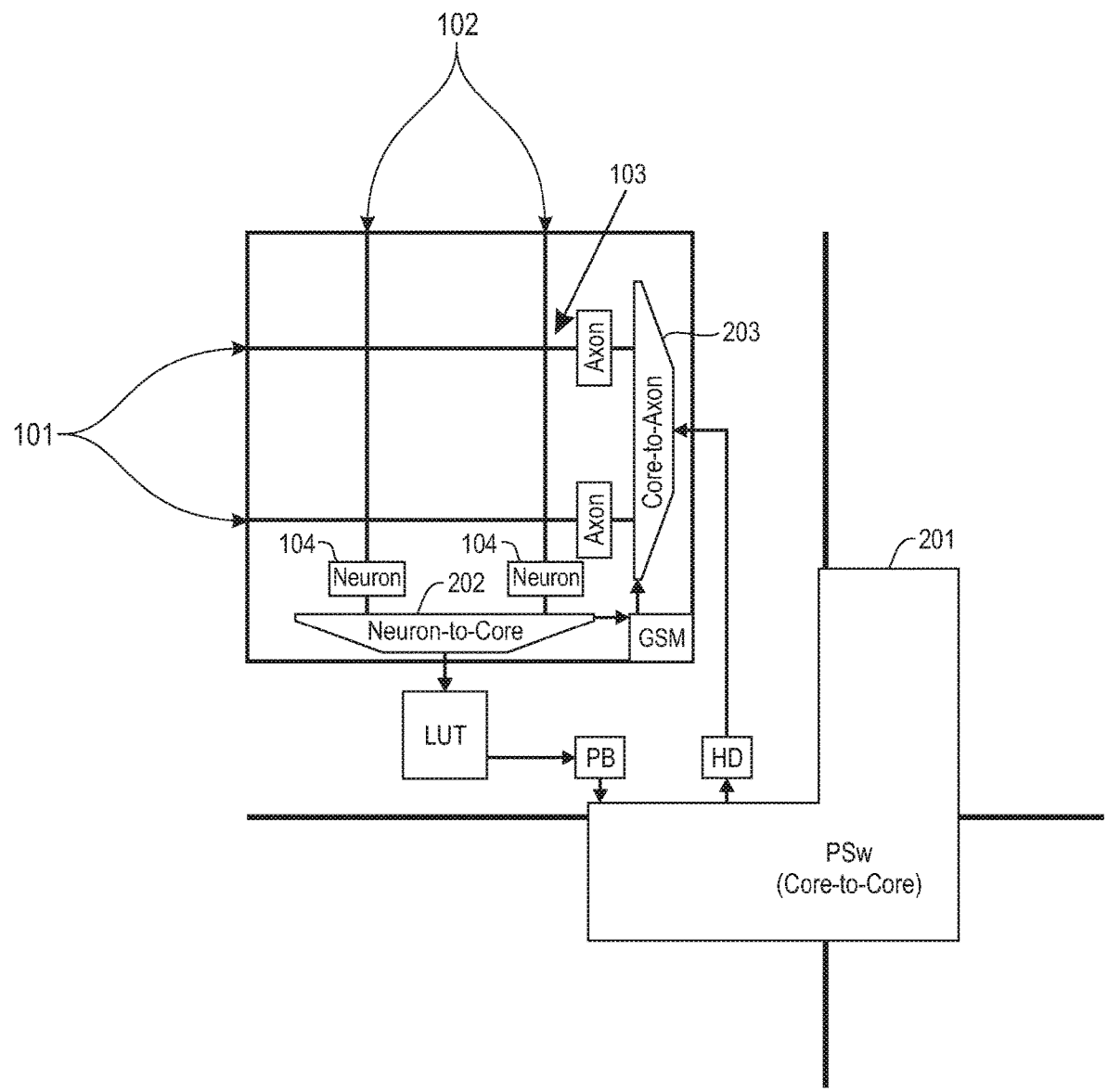
FIG. 2 depicts a neurosynaptic core and mesh router according to embodiments of the present disclosure.

In some embodiments a plurality of neurosynaptic cores are tiled on a chip. In an exemplary embodiment, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

In machine learning, a convolutional neural network (CNN) is a class of deep, feed-forward artificial neural networks applicable to analyzing visual imagery. A CNN consists of an input and an output layer, as well as multiple hidden layers. The hidden layers of a CNN typically consist of convolutional layers, pooling layers, fully connected layers and normalization layers. Convolutional layers apply a convolution operation to the input, passing the result to the next layer. The convolution emulates the response of an individual neuron to visual stimuli. Each convolutional neuron processes data only for its receptive field.

A convolution operation, allows a reduction in free parameters as compared to a fully connected feed forward network. In particular, tiling a given kernel allows a fixed number of parameters to be learned irrespective of image size. This likewise reduces the memory footprint for a given network.

A convolutional layer's parameters consist of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Figure 3:
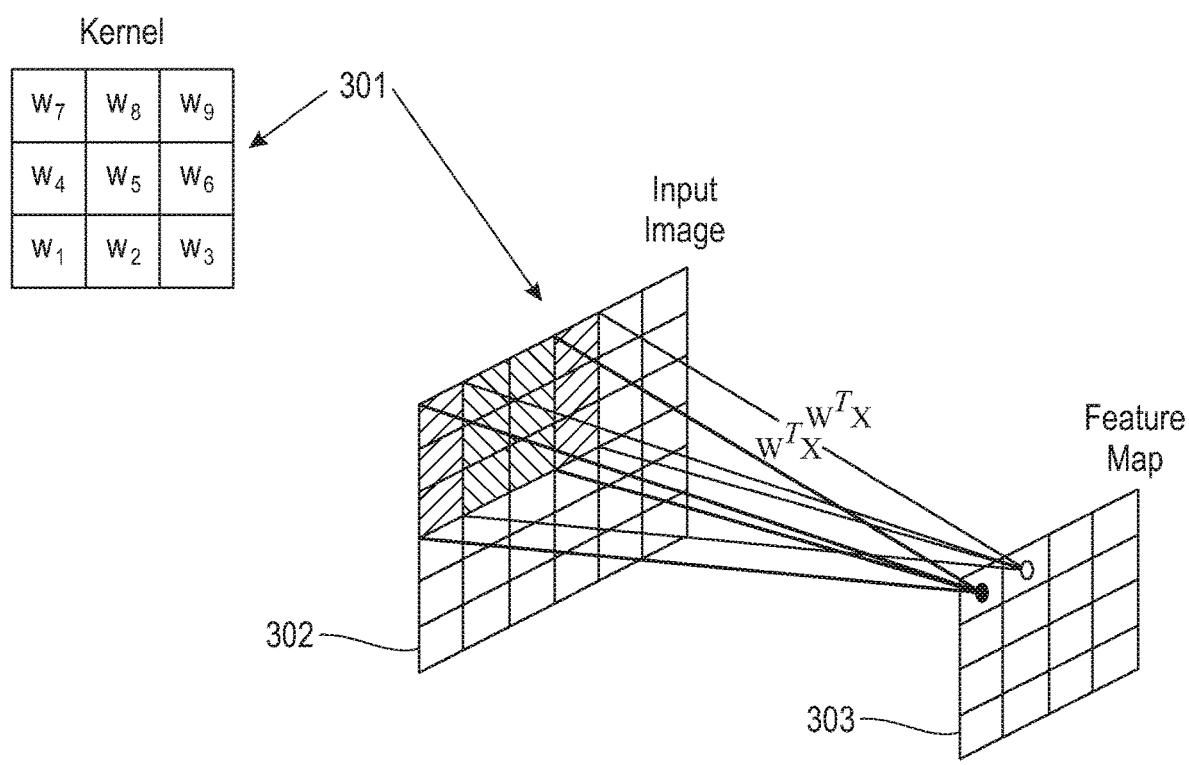
FIG. 3 depicts an exemplary convolution according to embodiments of the present disclosure.

Referring to FIG. 3, an exemplary convolution is illustrated. Kernel 301 comprises a plurality of weights $w_1$ . . . $w_9$. It will be appreciated that the sizes provided here are merely exemplary, and that any kernel dimension may be used as described herein. Kernel 301 is applied to each tile of image 302. In this example, two sequential 3×3 tiles are illustrated. The result of each tile is an element of feature map 303. It will be appreciated that a plurality of kernels may be applied to the same image in order to generate multiple feature maps.

Stacking the feature maps for all kernels forms a full output volume of the convolution layer. Every entry in the output volume can thus also be interpreted as an output of a neuron that looks at a small region in the input and shares parameters with neurons in the same feature map.

Convolutional neural networks may be implemented in various hardware, including neuromorphic chips and cores as described above. However, the number of inputs supported by an individual neurosynaptic core imposes a bottleneck on performance. For example, certain embodiments of TrueNorth have a low fan-in, taking up to 256 inputs. Other architectures have similar limits on total inputs to a given core.

As described in further detail below, by decomposing the tensor representation of the filter, performing partial summations, and then binding the results of the partial summations, it is possible to implement models with larger filters/kernels on limited size architectures. As set out below, this may represent a tradeoff with respect to achievable framerates, due to the exchange of partial summations' membrane potentials via rate code representations.

In an exemplary imagenet dataset, the methods described herein achieve a 30 frame per second classification rate and recover the full big-filter score at a drop in top-5 score of only ~0.5 percent.

Figure 4:
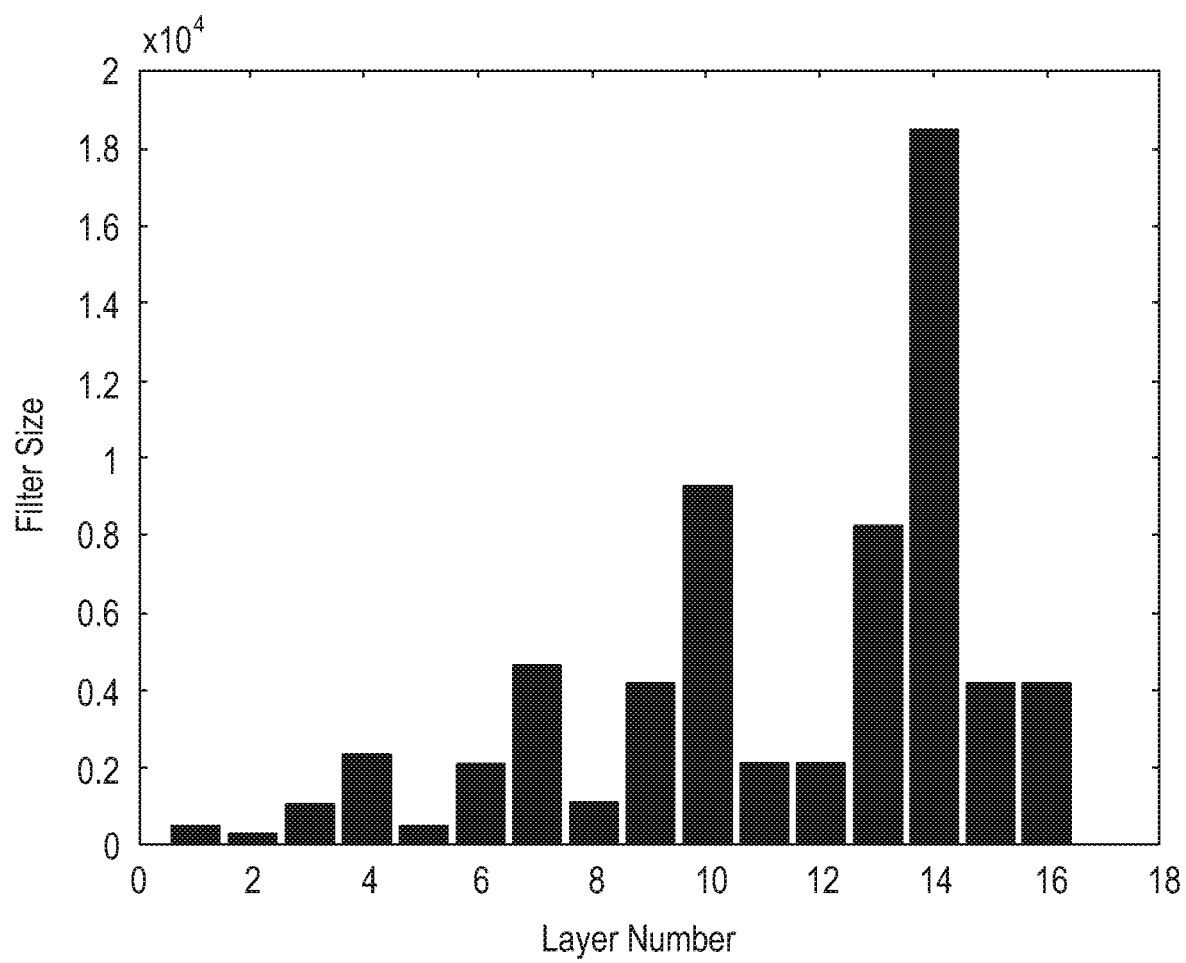
FIG. 4 is graph of filter sizes as a function of layer number, illustrating size distribution for an exemplary dataset.

Referring to FIG. 4, the distribution of filter sizes as a function of layer number is illustrated for an exemplary dataset. In this example, the largest filter/tensor has ~18,000 entries. This highlights the need for the methods described here, which enable implementation of such large filters in limited size hardware.

Given a k×l matrix M and an l×1 vector x, the computational task is to calculate a(Mx) where a( ) is some activation function. In the case of convolutional networks, for example, x is the input and each row of M encodes a filter applied at a different position of the input (e.g., an image) x. In Energy-efficient deep neuromorphic networks (EEDN), for example, a( ) is an activation function binarizing and thresholding the membrane potential of each of the k entries of Mx and producing as output a binary vector (each entry being 0 or 1) of length k. Row i of Mx is the dot product of row i of M with x. However, as noted above, a given neuromorphic system will only be able to perform efficiently dot products on vectors with at most n elements. For example, for EEDN networks, n=128.

Let $M=[M_1, M_2, \ldots, M_m]$, where each $M_i$ is an k×n matrix where, without loss of generality, it may be assumed that nm=l. Also assume $x=[x_1, \ldots, x_m]^T$, where each $x_i$ is a 1×n vector. Then $Mx=M_1x_1^T+M_2x_2^T+ \ldots +M_mx_m^T$. In other words, the matrix multiplication has been decomposed into a number of partial sums. However each $M_ix_i$ may potentially have a large dynamic range making it difficult to exchange the partial sums on an architecture like TrueNorth using rate codes. For example, if each element of $M_ix_i$ has the value 100, then 100 spikes would need to be exchanged per neuron (using 100 ticks) which would cause the algorithm to have a very high active power profile, which is undesirable.

To address this, it is instead $Mx \sim c(M_1x_1^T)+c(M_2x_2^T)+ \ldots +c(M_mx_m^T)$, where c(v) is some cropping function, pinning v to some interval centered at 0. In some embodiments, a different cropping function c( ) is applied to each partial sum. The cropping function can crop the dynamic range of each partial sum to a manageable interval so that 30 fps recognition rates can be achieved with a minimal degradation in accuracy. The algorithm that takes the summation of the cropped partial sums and then applies on this the activation function a(.) is referred to as the binding algorithm. This algorithm is useful in the decomposition of large unitary filters into multiple smaller filters (followed by a binding step) on neuromorphic hardware. Various exemplary implementations are described further below.

Figure 5:
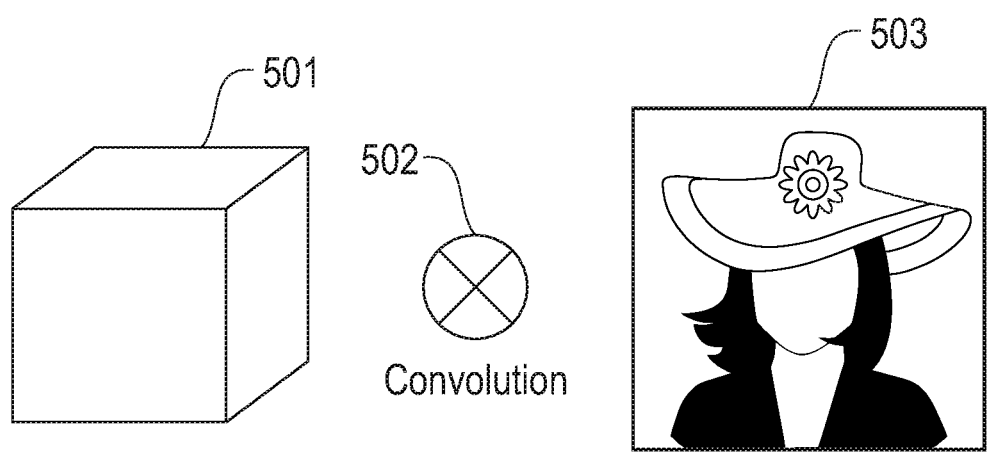
FIG. 5 illustrates an exemplary unitary kernel according to embodiments of the present disclosure.

Referring now to FIG. 5, an exemplary unitary kernel is illustrated. In a given convolutional layer, kernel 501 is applied to an input 503 to compute a single output feature's activation value (denoted $f_z$). In some embodiments, input 503 to the convolution 502 is an RGB image or the activations from a prior layer. Such a large unitary kernel cannot easily be mapped to a space-limited neuromorphic implementation.

Define a function $f_z(i,j,k):\{1, \ldots, H\} \times \{1, \ldots, W\} \times \{1, \ldots, F\} \rightarrow \{-D, \ldots D\}$. This function is referred to as the filter or kernel, where z is an index in a family of filters. For example, in an exemplary EEDN TrueNorth network, D=1, denoting trinary synaptic weights. Without loss of generality it may be assumed that H,W,F are powers of 2.

Also define a function $I(x, y, z):\{1, \ldots, H'\} \times \{1, \ldots, W'\} \times \{1, \ldots, F'\} \rightarrow \{0,1,2, \ldots, D'\}$. This is referred to as the input. It may be an input image or the response of some intermediate layer in the network. In the example of EEDN networks implemented in TrueNorth, D'=1 for intermediate layers, denoting a binary activation. For example, if this is the first layer of a convolutional neural network then H', W' denote the height and width of the image and F' is the number of channels in the image. For example, F'=3 and D'=255 for 8-bit RGB images.

In TrueNorth, if HWF>>128 then f may be referred to as a "big filter" since typically the filter cannot fit natively on a single TrueNorth core which has 256 axons. In the case of EEDN networks, HWF≤128. So, for a 3×3 filter, TrueNorth can only support filters with up to 14 channels. As described below, much larger values of F are needed to achieve good performance on difficult problems. In imagenet for example, over 1000 channels are needed for high level performance. As the dataset difficulty increases, the need for filters with larger F increases.

Define the convolution operator ⊗ as follows:

$$(f \otimes I)(x, y, z) = \sum_{i=1}^{H} \sum_{j=1}^{W} \sum_{k=1}^{F} f_z(i, j, k) I\left(x - i + \left(\frac{H}{2}\right), y - j + \left(\frac{W}{2}\right), k\right).$$

z is an index into a different output filter $f_z$ (f is a tensor denoting a family of filters $U_z\{f_z\}$, wherein z is an index into the set of filters) and variable k sums over all the features/channels of I. Without loss of generality, zero-padding can be assumed in cases when I is accessed outside of its domain. The word "convolution" may be used to denote dot product/correlation in which case $$(f \otimes I)(x, y, z) = \sum_{i=1}^{H} \sum_{j=1}^{W} \sum_{k=1}^{F} f_z(i, j, k) I\left(x + i - \left(\frac{H}{2}\right), y + j - \left(\frac{W}{2}\right), k\right).$$

The approaches described herein apply to both cases, so without loss of generality, the first case is assumed. As set out below, each filter f is decomposed into m smaller filters $f_z^1, \ldots, f_z^m$ (referred to as partial sums). These partial sums are then combined to obtain the value of f⊗I for all I. The decomposition is independent of the values in I, and is only dependent on the dimensions of I. Each of these smaller filters can be calculated using a single core, for example a TrueNorth core.

Figure 6:
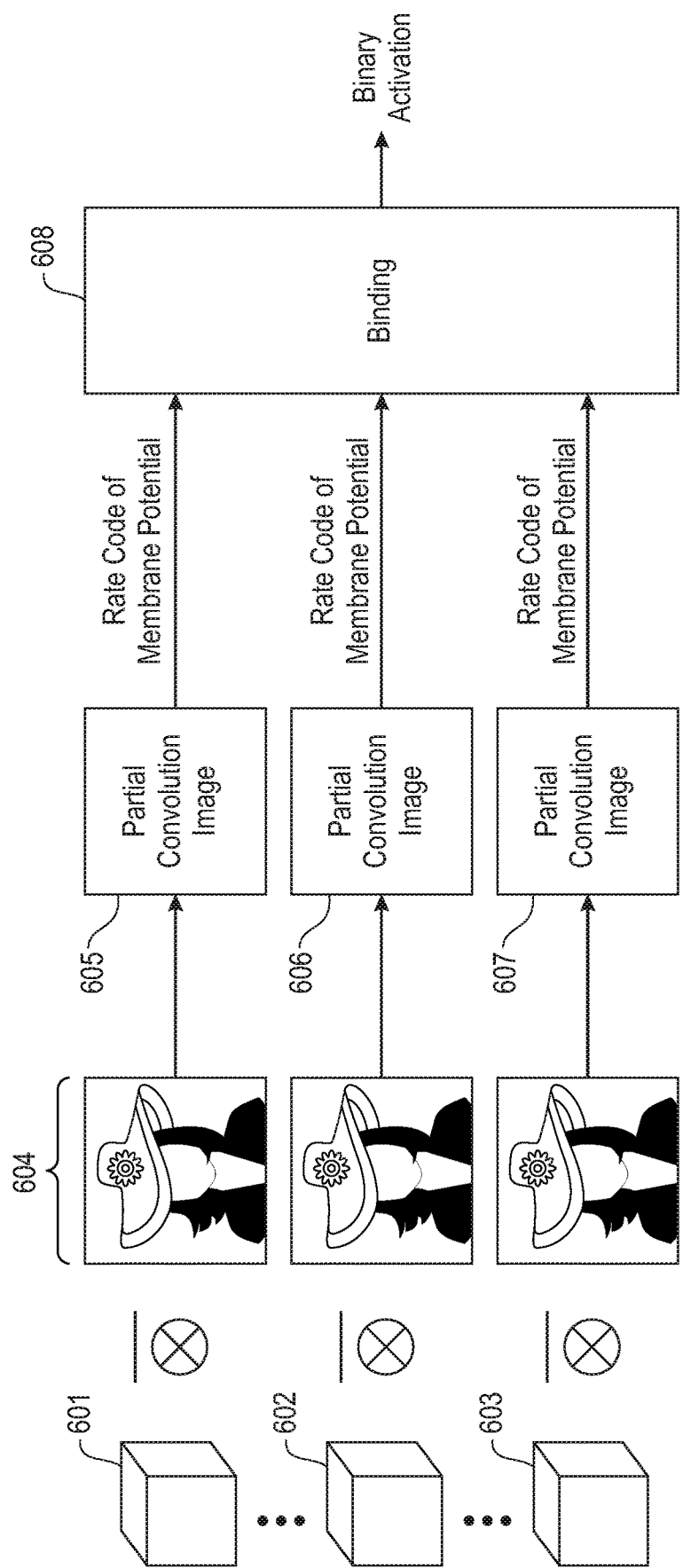
FIG. 6 illustrates the decomposition and processing of a kernel according to embodiments of the present disclosure.

Referring now to FIG. 6, the decomposition and processing of a kernel is illustrated according to embodiments of the present disclosure. Kernel 501 is decomposed into smaller sub-kernels 601 . . . 603. In various embodiments, sub-kernels 601 . . . 603 have a size below a predetermined value to accommodate underlying neuromorphic hardware. For example, each sub-kernel may have a maximum size of 128. As noted above, each sub-kernel may have about the same sparsity, to ensure about equally sparse activations. Sub-kernels are denoted in the prior discussion.

Sub-kernels 601 . . . 603 are applied to copies of input 604, to generate partial convolutional images 605 . . . 607. These distributed states represent the membrane potential without an activation function. The membrane potentials are sent in rate code for binding 608. As described above, binding 608 takes the rate codes of corresponding pixels, and sums them and thresholds them using the same threshold used with the larger filter 501. The result is a binary activation, 1 or 0 spikes per pixel.

An algorithm for kernel decomposition according to the present disclosure may be defined as in Equation 1, where C is defined in Equation 2, P is defined in Equation 3, crop is defined in Equation 4, and bind is defined in Equation 5. a( ) is some activation function as described previously. Each function $f_z^s$ has a much smaller support region than $f_z$ and therefore we can assume that is it only defined in the domain specified by H(s)×W(s)×F(s).

$$f \otimes I(x, y, z) = \text{bind}(C(x, y, z; 1, H(\cdot), W(\cdot), F(\cdot), I), \ldots, C(x, y, z; m, H(\cdot), W(\cdot), F(\cdot), I)) \quad \text{Equation 1}$$

$$C(x, y, z, ; s, H(\cdot), W(\cdot), F(\cdot), I) = \text{crop}(P(x, y, z, ; s, H(\cdot), W(\cdot), F(\cdot), I), [l, u]) \quad \text{Equation 2}$$

$$P(x, y, z, ; s, H(\cdot), W(\cdot), F(\cdot), I) = \sum_{i \in H(s)} \sum_{j \in W(s)} \sum_{k \in F(s)} f_z^s(i, j, k) I\left(x - i + \left(\frac{H}{2}\right), y - j + \left(\frac{W}{2}\right), k\right) \quad \text{Equation 3}$$

$$\text{crop}(v, [l\ u]) = \begin{cases} u, & \text{if } v > u \\ l, & \text{if } v < l \\ v, & \text{otherwise} \end{cases} \quad \text{Equation 4}$$

$$\text{bind}(v_1, \ldots, v_m) = a\left(\sum_{i=1}^{m} v_i\right) \quad \text{Equation 5}$$

H(.), W(.), F(.) are functions whose domain consists of indices {1, . . . , m}, specifying which of m partial kernels are being used, and whose range is a subset of {1, . . . , H}×{1, . . . , W}×{1, . . . F} respectively. They define a disjoint decomposition of the domain specified by the cross product {1, . . . , H}×{1, . . . , W}×{1, . . . , F}, or in other words: $U_{i=1}^{m}$ H(i)×W(i)×F(i)={1, . . . , H}×{1, . . . , W}×{1, . . . , F}. For all i≠j H(i)×W(i)×F(i) ∩H(j)×W(j)×F(j)=∅. Each of the "small" filters $f_z^s$ effectively sum over |H(s)|*|W(s)|*|F(s)| elements.

In the case of EEDN on TrueNorth networks, |H(s)|*|W(s)|*|F(s)|≤128 to accommodate the physical limitations of the cores.

The binding function bind( ) includes an activation function. For example, in the case of TrueNorth, the activation function produces a binary output depending on whether the summation of the cropped partial sums is above a certain threshold. The crop function defined above limits the dynamic range of each partial convolution and as a result the rate code representation of each partial sum becomes much smaller, providing gains in frame rates and active power consumption. In the case of Imagenet on TrueNorth, for example, the dynamic range may be cropped with little drop in performance while still achieving 30 fps. However, it will be appreciated that the crop function may be omitted without departing from the scope of the present disclosure.

Through tests on the Imagenet dataset it is demonstrated that a score of 84.03% can be achieved on neurons with trinary {−1,0,+1} weights, binary activations, and big filters. Unlike alternative approaches, this high-quality results can be achieved with low bit precision networks. This allows low bit precision networks to scale to much bigger datasets and be implementable in hardware. The addition of a distillation algorithms provides a 1-1.5% improvement in the score. Through the use of ensembles accuracies of 86-87% or higher are achievable.

Through tests on Recurrent Neural Networks (RNNs) with big filters for sequence prediction on the Penn Treebank and Wikipedia/text8 dataset, it is shown that recurrent neural networks can be implemented on neuromorphic hardware such as that provided by TrueNorth using trinary weights and binary activations, which means that big filters are also applicable to RNNs. Filter/kernel decomposition algorithm as described herein is also applicable to RNNs. In particular, the present disclosure enables prediction scores of 67.7% on PennTreebank and 66.27% on Wikipedia. This result is particularly high given that binary activations are used instead of rate code outputs.

Figure 7A:
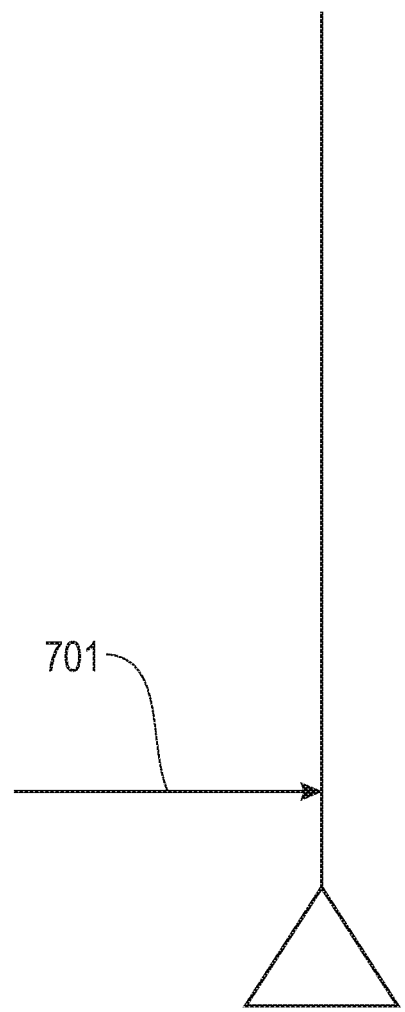
FIGS. 7A-D illustrate an exemplary corelet implementation of partial convolution according to embodiments of the present disclosure.
Figure 7B:
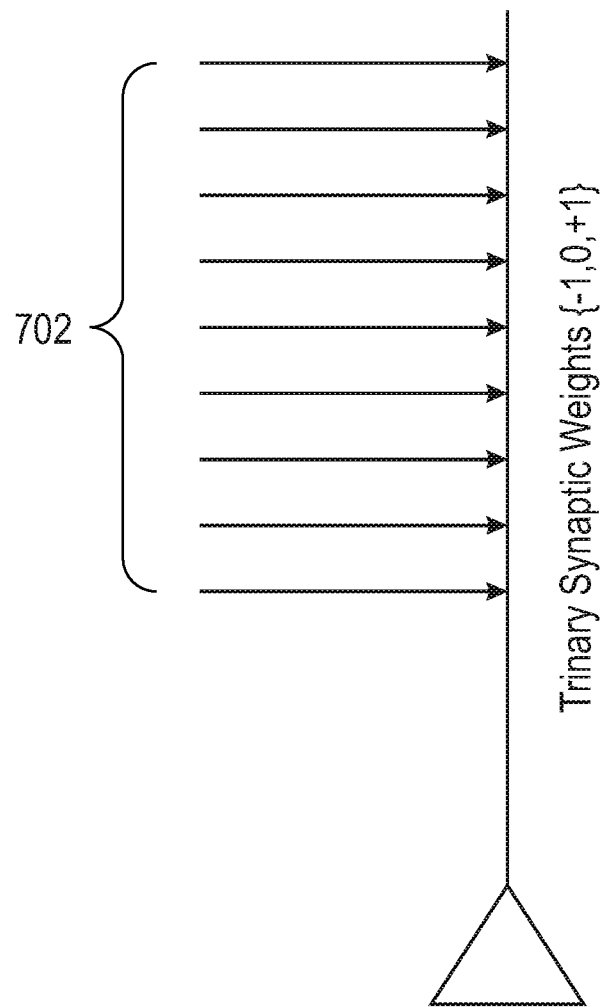

Referring now to FIGS. 7A-D, an exemplary corelet implementation of partial convolution is illustrated according to embodiments of the present disclosure. In this example, it is assumed that the TrueNorth neuron has gamma=1, with threshold alpha=1, and beta=−32 as its corelet parameters. For illustration purposes this example assumes that the summation of the input will lie in the interval [−16, +16]. In FIG. 7A, a control pulse 701 is received to initialize the membrane potential to −16. In FIG. 7B, a summation is performed with trinary weights 702 corresponding to a sub-tensor kernel. The membrane potential will be at most zero so no output spike is produced. In an exemplary TreuNorth implementation, up to 128 inputs are allowed due to neuron fan-in constraint of 256.

Figure 7C:
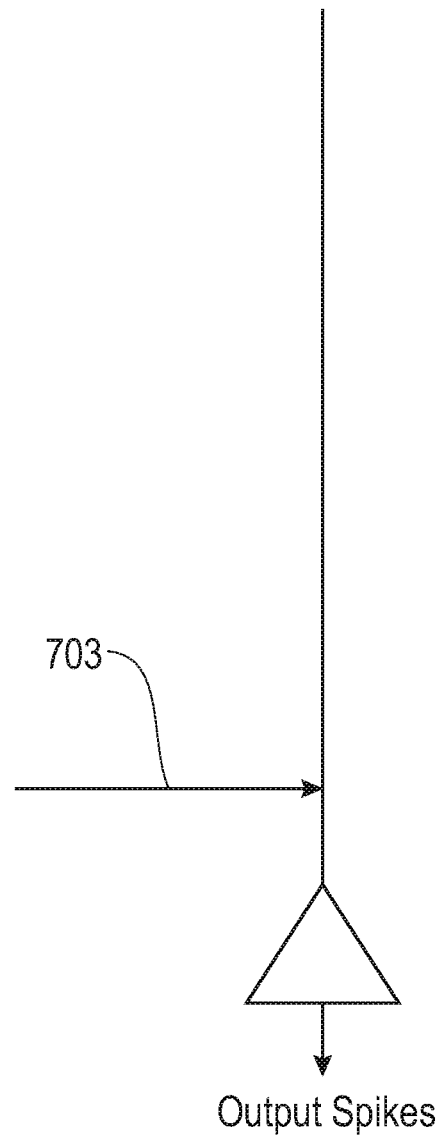

In FIG. 7C, a control pulse is received to increase the membrane potential by a value of +32. Since alpha=1, the neuron may now start firing. If the initial membrane potential was −20 for example, then the neuron will fire −20+32=12 times signifying that it encodes the value of −4. If the initial membrane potential was −32 (the lowest), it would spike −32+32=0 times, signifying that it encodes the value of −16.

Figure 7D:
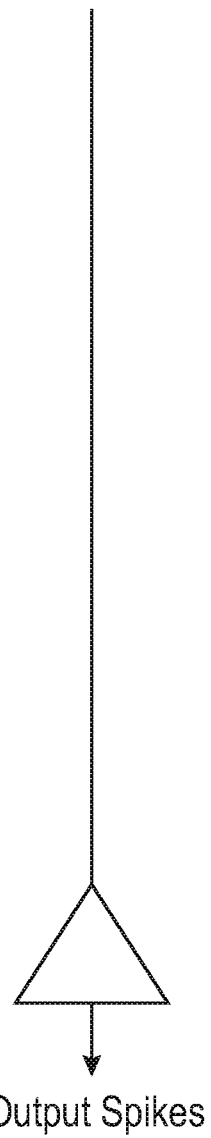

In FIG. 7D, the system waits 32 ticks so that all the spikes have exited, at which point the process may repeat, by resetting the membrane potential to −16 as in as set out in FIG. 7A and repeating the process for the next frame. A burst code is output.

Referring to FIGS. 8A-D, an exemplary corelet implementation of binding is illustrated according to embodiments of the present disclosure. The binding neuron sums the partial summations from the previous steps, and outputs a spike if and only if the corresponding big-filter neuron would have output a spike. In this example, it is assumed that the binding neuron takes the partial summations corresponding to a single big-filter output feature, which is represented by 4 smaller tensor partial convolutions. In terms of the TrueNorth neuron parameters, this is a gamma=0, alpha=c neuron, with beta=−129, where c is the spiking threshold. For simplicity of exposition, it is assumed that c>=0. If c<0 the functionality is achievable using different beta and alpha values.

Figure 8A:
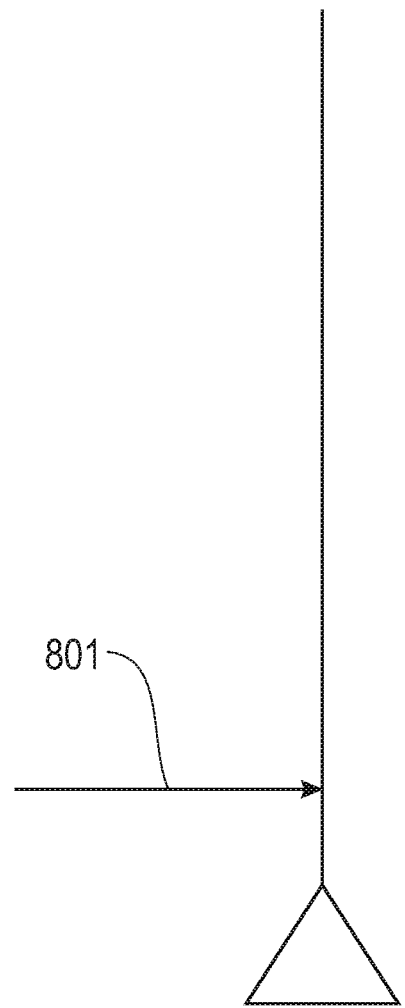
FIGS. 8A-D illustrate an exemplary corelet implementation of binding according to embodiments of the present disclosure.
Figure 8B:
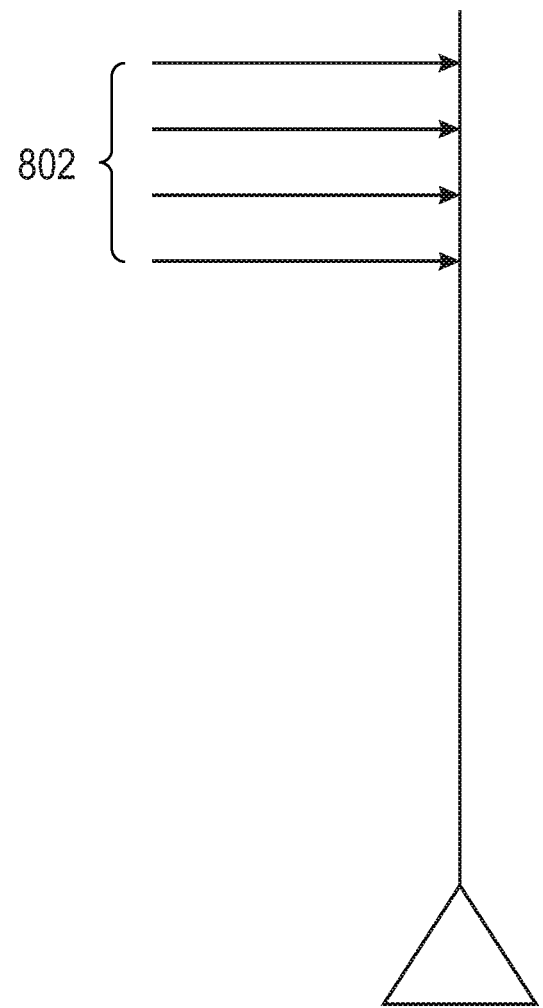

In FIG. 8A, a control pulse 801 is received to initialize the membrane potential to −128−1=−129. In FIG. 8B, input burst codes 802 from the 4 partial sums are received. No output spike is produced due to how the membrane potential has been initialized. This increases the membrane potential by up to +128.

Figure 8C:
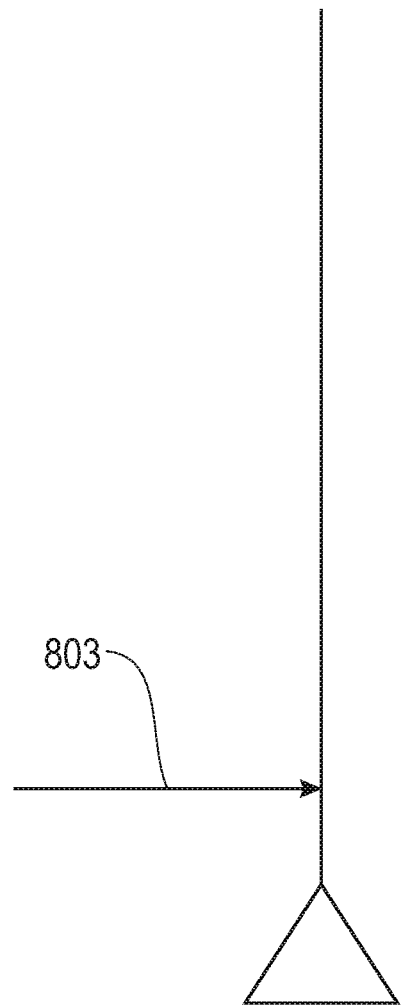
Figure 8D:
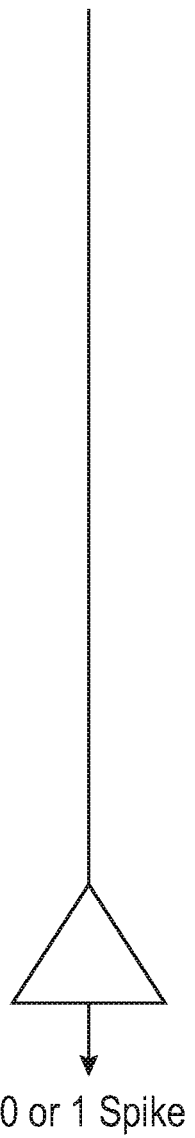

In FIG. 8C, control pulse 803 is received to increment the membrane potential by 4*(16)+1=65 in a single step. In FIG. 8D, the neuron produces one output spike if an only if the corresponding big filter neuron would have produced a spike. The process may be repeated by returning to FIG. 8A, to re-initialize the neuron membrane potential and repeat.

In the above example, it is assumed that the membrane potential was in the [−16, 16] interval. By setting k=1, and since beta=−32, it is guaranteed that if the summation was less than −16 it is clipped to −16. When the neuron starts spiking, it is only permitted to spike for 32 ticks, at which point it is reset, effectively clipping its top value to +16 if the summation happened to be over 16.

It will be appreciated that the above corelet implementation is one of many examples, and that the present disclosure may be implemented in a variety of hardware neuromorphic architectures in order to simulate crossbars with a bigger fan-in.

Figure 9:
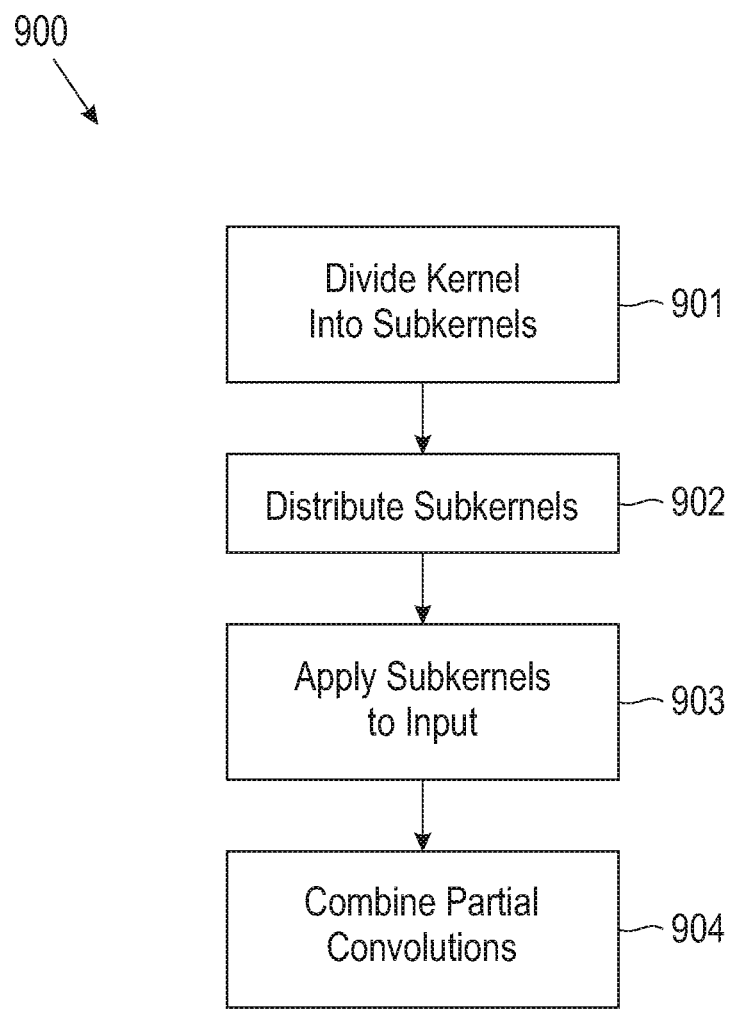
FIG. 9 illustrates a method for tensor decomposition and neuron activation binding according to embodiments of the present disclosure.

Referring to FIG. 9, a method of tensor decomposition and neuron activation binding is illustrated. At 901, a kernel is divided into a plurality of subkernels. Each subkernel has less than a predetermined size. At 902, the plurality of subkernels are distributed, each to one of a plurality of neurosynaptic processors. At 903, by each of the plurality of neurosynaptic processors, one of the subkernels is applied to an input to generate a partial convolution. At 904, the partial convolutions from each of the plurality of neurosynaptic processors are combined to determine an activation.

Figure 10:
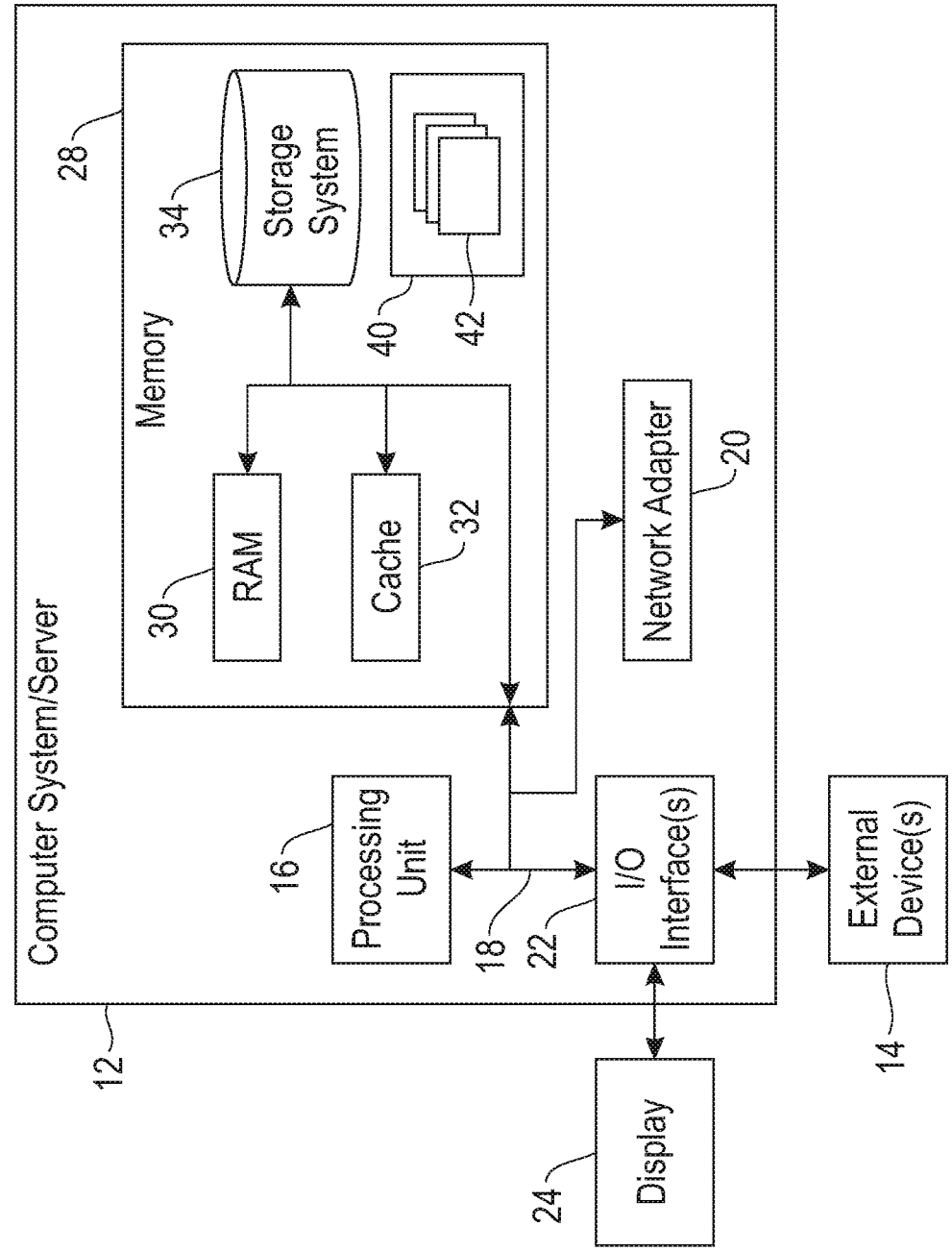
FIG. 10 depicts a computing node according to an embodiment of the present invention.

Referring now to FIG. 10, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    dividing a kernel into a plurality of subkernels, each subkernel having less than a predetermined size;
    distributing the plurality of subkernels, each to one of a plurality of neurosynaptic processors;
    by each of the plurality of neurosynaptic processors, applying one of the subkernels to an input to generate a partial convolution, wherein generating the partial convolutions comprises computing partial sums and wherein the partial sums are represented in rate code;
    combining the partial convolutions from each of the plurality of neurosynaptic processors to determine an activation.

2. The method of claim 1, wherein combining the partial convolutions comprises summing the partial sums.

3. The method of claim 2, wherein combining the partial convolutions comprises thresholding.

4. The method of claim 1, wherein each of the plurality of neurosynaptic processors comprises a plurality of synapses.

5. The method of claim 4, wherein the synapses are trinary.

6. The method of claim 1, wherein each of the plurality of subkernels has about the same sparsity.

7. The method of claim 1, further comprising: clipping the partial convolutions.

8. The method of claim 1, wherein the input comprises an image.

9. The method of claim 1, wherein the input comprises the output of a layer of a neural network.

10. A system comprising:
    a plurality of neurosynaptic processors comprising a plurality of synapses, each of the plurality of neurosynaptic processors adapted to:
    receive one of a plurality of subkernels of a kernel, each subkernel having less than a predetermined size;
    apply the one of the plurality of subkernels to an input to generate a partial convolution, wherein generating the partial convolutions comprises computing partial sums and wherein the partial sums are represented in rate code;
    a neurosynaptic processor adapted to receive the partial convolutions from each of the plurality of neurosynaptic processors and to determine an activation therefrom.

11. The system of claim 10, wherein combining the partial convolutions comprises summing the partial sums.

12. The system of claim 11, wherein combining the partial convolutions comprises thresholding.

13. The system of claim 10, wherein each of the plurality of neurosynaptic processors comprises a plurality of synapses.

14. The system of claim 13, wherein the synapses are trinary.

15. The system of claim 10, wherein each of the plurality of subkernels has about the same sparsity.

16. A computer program product for tensor decomposition and neuron activation binding, the computer program product comprising a computer readable storage medium having program instructions embodied therewith, the program instructions executable by a processor to cause the processor to perform a method comprising:

dividing a kernel into a plurality of subkernels, each subkernel having less than a predetermined size;

distributing the plurality of subkernels, each to one of a plurality of neurosynaptic processors;

by each of the plurality of neurosynaptic processors, applying one of the subkernels to an input to generate a partial convolution, wherein generating the partial convolutions comprises computing partial sums and wherein the partial sums are represented in rate code;

combining the partial convolutions from each of the plurality of neurosynaptic processors to determine an activation.

17. The computer program of claim 16, wherein combining the partial convolutions comprises summing the partial sums.

18. The computer program of claim 16, wherein each of the plurality of neurosynaptic processor comprises a plurality of synapses.

19. The computer program of claim 17, wherein the synapses are trinary.

20. The computer program of claim 16, wherein each of the plurality of subkernels has about the same sparsity.

* * * * *